US007941459B1

(12) United States Patent
Erickson (10) Patent No.: US 7,941,459 B1
(45) Date of Patent: May 10, 2011

(54) SELECTABLE USE OF SINGLE-INSTANCE STORE BACKUP METHODOLOGY IN COMBINATION WITH OTHER METHODS

(75) Inventor: Mark Erickson, Brooklyn Park, MN (US)

(73) Assignee: Symantec Corporation, Mountain View, CA (US)

( * ) Notice: Subject to any disclaimer, the term of this patent is extended or adjusted under 35 U.S.C. 154(b) by 435 days.

(21) Appl. No.: 11/693,378

(22) Filed: Mar. 29, 2007

(51) Int. Cl.
*G06F 17/00* (2006.01)

(52) U.S. Cl. ........ 707/803; 707/626; 707/791; 707/793; 707/807; 707/650

(58) Field of Classification Search .......... 707/101–102, 707/203–204, 626, 650, 791, 793, 803, 807
See application file for complete search history.

(56) References Cited

U.S. PATENT DOCUMENTS

| | | | |
|---|---|---|---|
| 6,389,433 B1 | 5/2002 | Bolosky et al. | |
| 6,513,051 B1 | 1/2003 | Bolosky et al. | |
| 6,920,537 B2 | 7/2005 | Ofek et al. | |
| 6,983,345 B2 | 1/2006 | Lapir et al. | |
| 7,069,270 B1 * | 6/2006 | Kumar ................................. 1/1 |
| 7,200,604 B2 | 4/2007 | Forman et al. | |
| 7,310,644 B2 | 12/2007 | Adya et al. | |
| 7,359,920 B1 | 4/2008 | Rybicki et al. | |
| 7,366,836 B1 | 4/2008 | Todd et al. | |
| 7,376,681 B1 | 5/2008 | Todd et al. | |
| 7,424,514 B2 | 9/2008 | Noble et al. | |
| 7,478,113 B1 | 1/2009 | De Spiegeleer et al. | |
| 2008/0208933 A1 * | 8/2008 | Lyon .............................. 707/204 |

* cited by examiner

*Primary Examiner* — Sana Al-Hashemi
(74) *Attorney, Agent, or Firm* — Rory D. Rankin; Meyertons, Hood, Kivlin, Kowert & Goetzel, P.C.

(57) ABSTRACT

System and method for exporting single-instance data. A computer system includes a host configured to select a dataset having a first attribute and convey a request to a catalog to export the dataset. The first attribute is a data selection identifying a source of the dataset and a point in time at which data objects were sent from the data selection to the single-instance storage pool. The catalog identifies data objects whose attributes match the first attribute and conveys a request to a single-instance storage pool to retrieve the data objects. In response, the single-instance storage pool associates data segments with each of the data objects, re-assembles each of the data objects from its associated data segments, and conveys the re-assembled data objects to the catalog. The catalog converts the received re-assembled data objects into the dataset.

17 Claims, 8 Drawing Sheets

SELECTABLE USE OF SINGLE-INSTANCE STORE BACKUP METHODOLOGY IN COMBINATION WITH OTHER METHODS

BACKGROUND OF THE INVENTION

1. Field of the Invention

This invention relates to computer systems and, more particularly, to backup and restoration of data within computer systems.

2. Description of the Related Art

There is an increasing need for organizations to protect data that resides on a variety of client devices via some type of backup mechanism. For example, numerous client devices may be coupled to a network to which one or more media servers are also coupled. The media servers may include or be further coupled to a storage pool consisting of one or more disk storage devices, tape drives, or other backup media. A backup agent on each client device may convey data files to the media server for storage according to a variety of schedules, policies, etc. For example, large backup datasets may be moved from a client device to a media server configured to store data for later retrieval, thereby protecting data from loss due to user error, system failure, outages, and disasters, etc. as well as archiving information for regulatory compliance, workflow tracking, etc. Backup media of the type described above may commonly store datasets in a format that will be referred to herein as an archival format.

Unfortunately, backup and restore to media in archival format may be slow and may require an administrator or technician to retrieve and mount storage media, etc. In order to make data more readily available and to reduce the storage capacity required, single-instance storage techniques have become popular. In a single-instance storage system, data is stored in segments, with each segment having a fingerprint that may be used to unambiguously identify it. For example, a data file may be segmented, and a fingerprint calculated for each segment. Duplicate copies of data segments are replaced by a single instance of the segment and a set of references to the segment, one for each copy. In order to retrieve a backup file, a set of identifiers (e.g., fingerprints) is sent to the single-instance storage system, where it is compared to the fingerprints of data stored in a storage pool. For each matching fingerprint, a data segment is retrieved. The resulting segments may be re-assembled to produce the desired file.

In order to facilitate retrieval and re-assembly of data objects from data segments, one or more metadata managers may store metadata describing the data stored in a single-instance storage pool in a catalog that is separate from the storage pool itself. Such a catalog may be referred to as a metabase. Metadata managers may be located on separate hosts or co-located on hosts that include a single-instance storage pool. Accordingly, one or more metabases hosted in a variety of locations may contain data describing each storage pool.

It is possible for both archival format backup techniques and single-instance storage techniques to be used in the same system. Archival format techniques have an advantage in that a snapshot of the state of a host's data may be stored and retrieved intact. This may be desirable from a legal or regulatory point of view. Using archival format techniques, it is straightforward to store multiple versions of a dataset that are created at different points in time and retrieve these datasets based on a time of interest. Unfortunately, archival format techniques may be time-consuming and cumbersome. There may be only a selected set of points-in-time for which an archival version of a dataset exists. In addition, it may be difficult to create a backup dataset at a busy time when a host's data is changing frequently such as at the end of a quarter, although these may be times for which a backup dataset is most often desired. In contrast, single-instance storage backup operations may take less time because de-duplication reduces the amount of data to be transferred and stored. The resulting smaller datasets may be stored on disk media rather than removable media, making for an easier backup process. These factors allow more frequent backups, including backups at critical reporting times such as the end of a quarter. Unfortunately, single-instance data is de-duplicated, which means the data objects or data segments from a given point-in-time that are duplicates are not copied to the single-instance storage pool, making reconstruction of a dataset from a previous point-in-time more difficult.

In addition to the above considerations, archival format backup techniques and single-instance storage techniques are generally executed through different software interfaces. These interfaces may not present a consistent set of attributes of their respective backup datasets. Also, they may present different models for dataset retrieval. For example, archival format backup datasets may be retrieved based on a particular timestamp, whereas single-instance storage backup datasets may be retrieved based on each data object's fingerprint, regardless of the time at which it was stored.

In view of the above, an effective system and method for extracting data from both single-stance storage pools and archival format storage pools through a common interface and converting the results to an archival format that accounts for these issues is desired.

SUMMARY OF THE INVENTION

Various embodiments of a computer system and methods are disclosed. In one embodiment, a computer system includes a host configured to select a dataset having a first attribute and convey a request to a catalog to export the dataset. The catalog includes a plurality of entries, each entry identifying a data object and including an associated set of data object attributes. In response to the request to export the dataset, the catalog is configured to identify a set of data objects whose attributes match the first attribute and convey a request to a single-instance storage pool to retrieve the set of data objects. The single-instance storage pool stores a plurality of data segments. In response to the request to retrieve the set of data objects, the single-instance storage pool is configured to associate data segments with each of the set of data objects, re-assemble each of the set of data objects from its associated data segments, and convey the re-assembled data objects to the catalog. In response to receiving the re-assembled data objects, the catalog is configured to convert the re-assembled data objects into the dataset.

In a further embodiment, the first attribute comprises a data selection identifying a source of the dataset and a point in time at which data objects were sent from the data selection to the single-instance storage pool. The data selection may comprise data files stored on a host, a file folder containing data files stored on a host, or a filter applied to data files stored on a host. In a still further embodiment, the catalog is further configured to convert the re-assembled data objects into the dataset in an archival format. The archival format may be a format used to store backup datasets on backup media.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
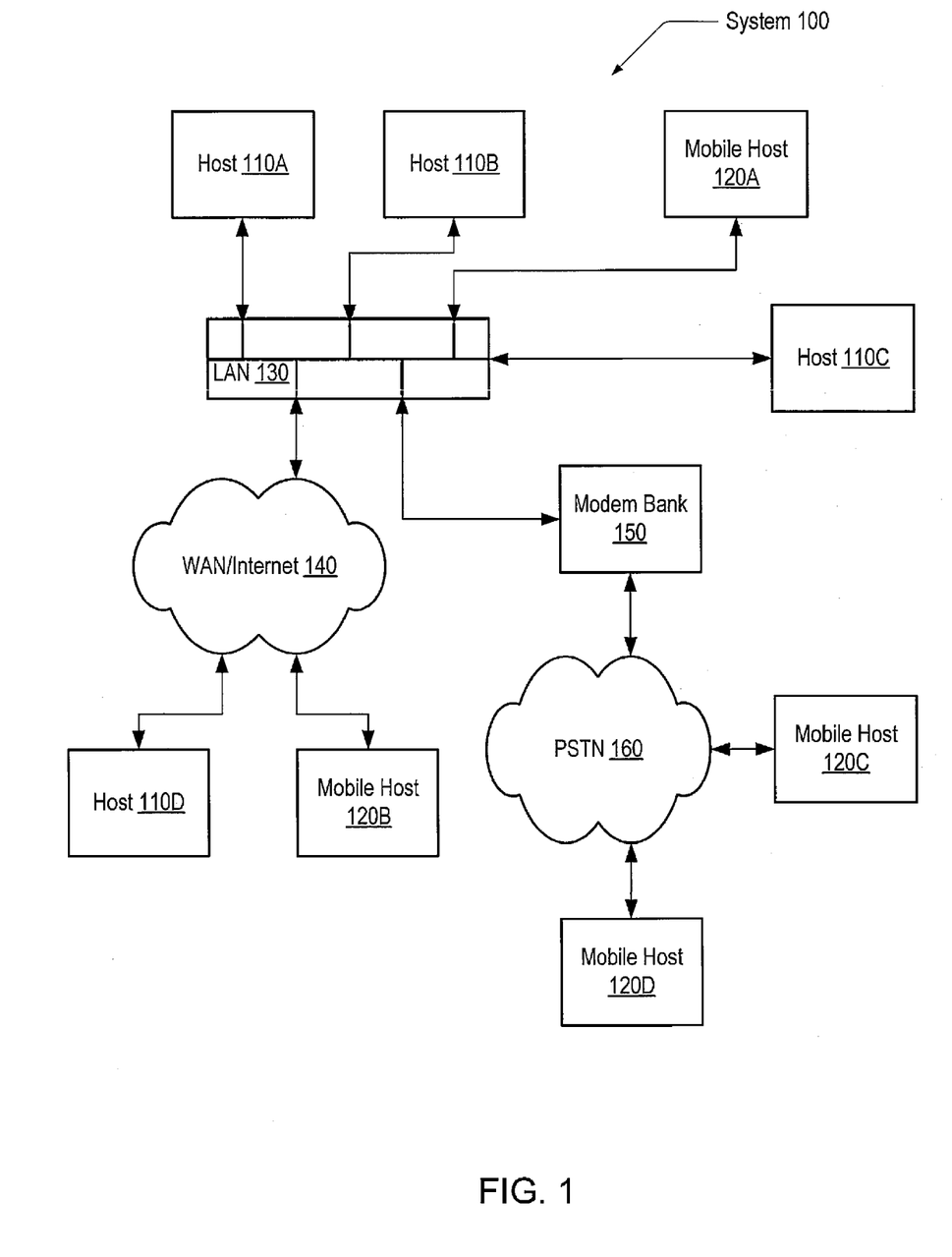
FIG. 1 illustrates one embodiment of a computer system.

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which is in turn coupled to a public switched telephone network (PSTN) 160. Hosts 110A-110D are representative of any number of stationary computers. Mobile hosts 120A-120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
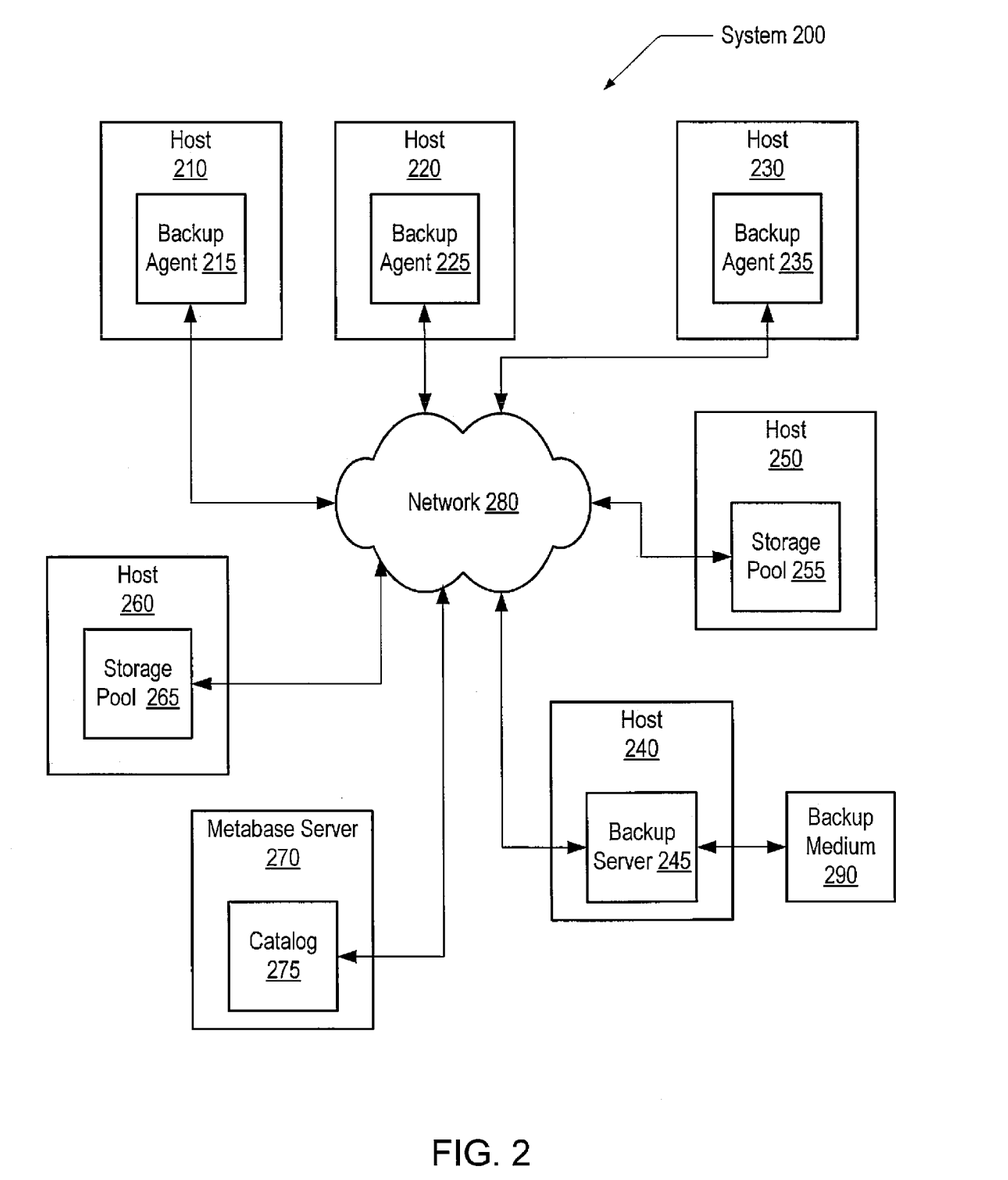
FIG. 2 is a generalized block diagram of one embodiment of a backup system that may operate within a computer system.

Within system 100, it may be desired to protect data associated with any of hosts 110A-110D and mobile hosts 120A-120D. In order to protect host-associated data, various backup components may operate on hosts 110A-110D and mobile hosts 120A-120D. Turning now to FIG. 2, a generalized block diagram of one embodiment of a backup system 200 that may operate within system 100 is shown. System 200 includes hosts 210, 220, 230, 240, 250, and 260 coupled through network 280 to a metabase server 270. Backup agents 215, 225, and 235 may operate on hosts 210, 220, and 230, respectively. A backup server 245 may operate on host 245 and be coupled to a backup medium 290, on which backup datasets may be stored in an archival format. In the illustrated embodiment, host 250 includes a storage pool 255 in which single-instance copies of data from one or more hosts may be stored. Similarly, host 260 includes a storage pool 265 in which a copy of data from one or more hosts may be stored. In one embodiment, storage pools 255 and/or 265 may be a single-instance storage pool. In further embodiments, storage pools 255 and 265 may be separate from their respective hosts. Additional storage pools (not shown) may also be included in system 200, depending on the storage requirements of the system. Metabase server 270 includes a catalog 275 on which may be stored metadata describing the data stored in storage pools 255 and 265.

During operation, backup agents 215, 225, and 235 may perform single-instance storage data backups and archival data backups. For example, in one embodiment data may be conveyed to one or more storage pools and associated metadata conveyed to one or more metabases. Data may also be conveyed to backup server 245 and stored on backup medium 290. Backup frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise.

Figure 3:
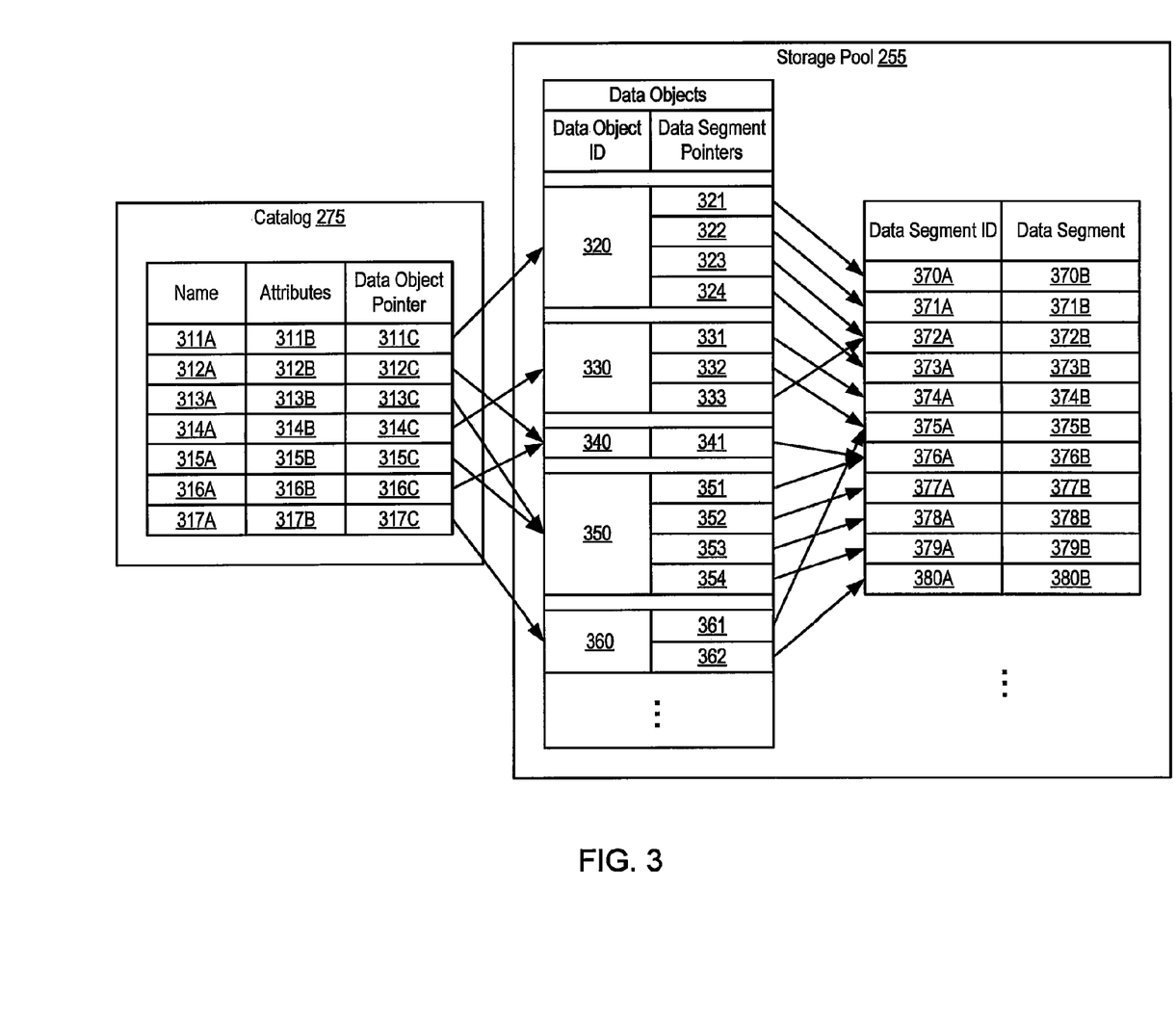
FIG. 3 illustrates one embodiment of metadata in a catalog and its associated data in a storage pool.

FIG. 3 illustrates one embodiment of metadata in catalog 275 and its associated data in storage pool 255. Catalog 275 includes a table of entries, each of which corresponds to a data entity such as a file, a folder, or a backup dataset. Each entry includes a name, a set of attributes, and a pointer to a corresponding data entity. For example, the first entry in the illustrated embodiment may include name 311A, attributed 311B, and data object pointer 311C that correspond to a data entity 311. Similar entries are shown for data entities 312-317. In one embodiment, names such as name 311A may consist of a user-readable string. Attributes such as 311B may include a variety of metadata describing the associated data entity such as one or more of: an entity size, batch number, type, version number, ownership, permissions, creation date and time, modification date and time, error code, etc. Data object pointers such as pointer 311C may consist of a user-readable string or other data that may be used as a key to find a corresponding data object in storage pool 255. Since multiple entities may have the same name, in one embodiment each pointer may be a fingerprint that unambiguously identifies each data object. A fingerprint, as used herein, refers to a function of a data entity (e.g., a data object or a portion of a data object) such as a hash function. In one embodiment, the fingerprints may be encrypted. More particularly, a fingerprint may comprise a Message-Digest algorithm 5 (MD5) or other hash function. Alternative hash functions include Secure Hash Algorithm (SHA), a checksum, signature data, and any other suitable function, cryptographic, or otherwise, for identifying a data entity. Copies of data entities such as files or file segments may be identified by comparing a fingerprint of one entity to the fingerprint of another entity. If the fingerprints match, then the two entities are copies of each other. Other forms of attributes and/or identifiers will be apparent to those of ordinary skill in the art.

Storage pool 255 may include a table of data objects and a pool of single-instance data segments. Each entry in the table of data objects includes a data object ID and an associated set of data segment pointers. Each data object ID may be a data object fingerprint or similar identifier. Each data segment pointer may be a data segment fingerprint or similar identifier. In the illustrated embodiment, table entries are shown for data objects 320, 330, 340, 350, and 360. Data object 320 is associated with data segments pointed to by pointers 321-

324, data object 330 is associated with data segments pointed to by pointers 331-333, data object 340 is associated with a data segment pointed to by pointer 341, data object 350 is associated with data segments pointed to by pointers 351-354, and data object 360 is associated with data segments pointed to by pointers 361-362. Each data segment pointer points to a corresponding data segment entry in the single-instance storage pool. The single-instance storage pool includes entries, each of which includes a data segment and a data segment ID. Each data segment ID may be a data segment fingerprint or similar identifier. In the illustrated embodiment, an entry is shown to include ID 370A and associated data segment 370B, ID 371A and associated data segment 371B, etc.

Figure 4:
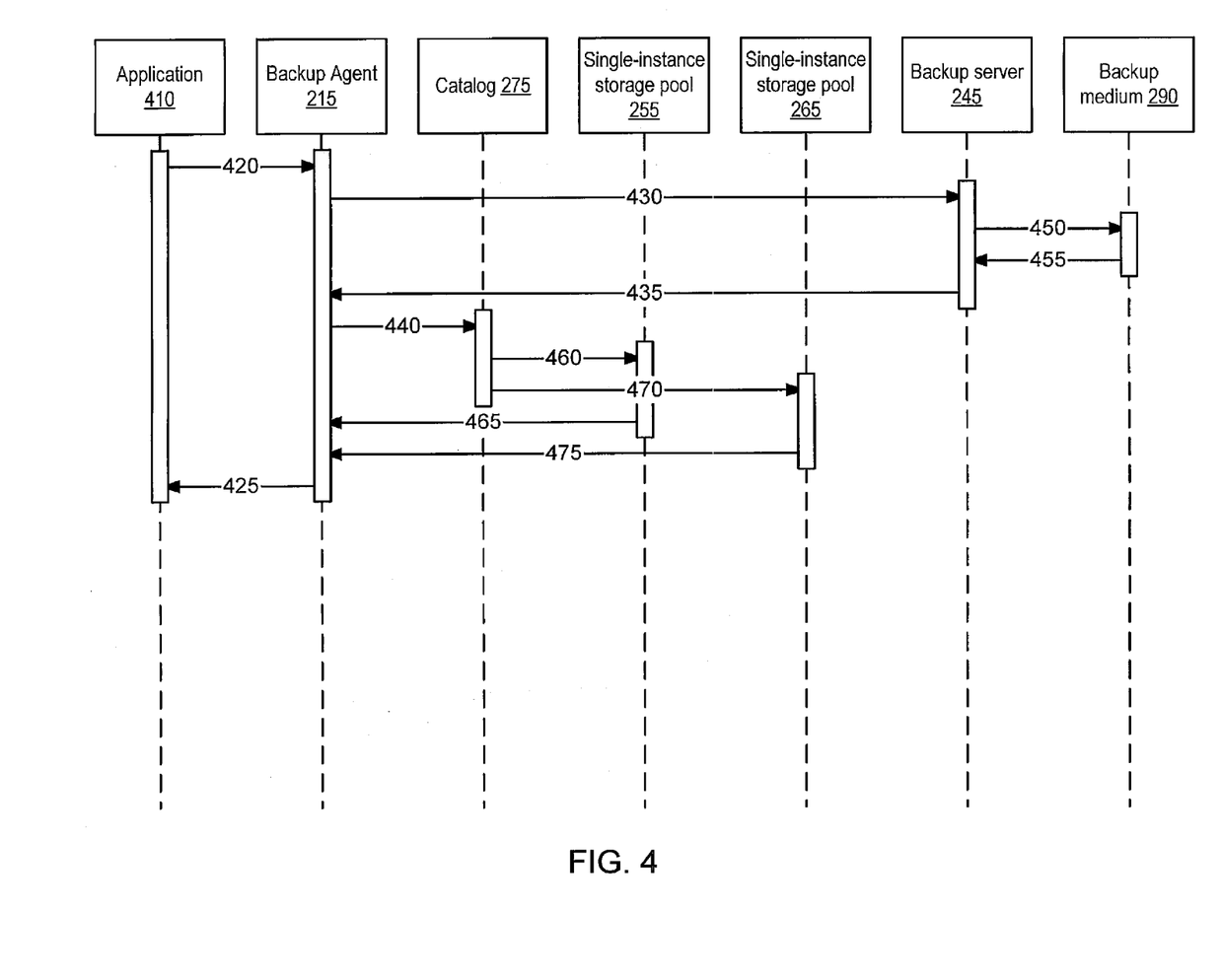
FIG. 4 is a sequence diagram illustrating one embodiment of a data export operation.

Within storage pool 255, one or more data segment pointers may point to each of data segments 370-380. For example, data segment pointer 321 points to data segments 370, 322 to 371, 323 to 372, etc. Since storage pool 255 may be a single-instance storage pool, any given data segment may be a copy of a data segment from more than one data object, that is, data segments within storage pool 255 may be de-duplicated. For example, in the illustrated embodiment, data segment pointers 323 and 333 point to data segment 372, indicating that data segment 372 is a copy of a segment of both data object 320 and data object 330. Similarly, pointers 332 and 361 point to data segment 375 and pointers 341 and 351 point to data segment 376. The data segment pointers of storage pool 255 may be used as keys for finding each of the data segments of a data object during a retrieval operation Having described the structure and organization of one embodiment of a catalog and its associated single-instance storage pool, attention will now turn to exporting data from the storage pool. FIG. 4 is a sequence diagram illustrating one embodiment of a data export operation. The actors included in the data export operation are application 410, backup agent 215, catalog 275, single-instance storage pools 255 and 265, backup server 2245, and backup medium 290. In the illustrated embodiment it is assumed that application 410 may request a dataset, such as an archival format of every data file stored on a host associated with backup agent 215. It is further assumed that backup agent 215 has stored data entities in an archival format on backup medium 290 through backup server 245 as well as storing other data entities in single-instance storage pools 255 and 265. Catalog 275 includes metadata describing the data entities stored in pools 255 and 265.

Data export begins when application 410 sends a request 420 for a dataset in archival format to backup agent 215. In response, backup agent 215 may send a request 430 to backup server 245 to retrieve an archived dataset corresponding to at least a portion of the dataset requested by application 410 and a request 440 to catalog 275 to retrieve an archived dataset corresponding to at least another portion of the dataset requested by application 410. Backup server 245 may send a retrieval request 450 to backup medium 290 in response to receiving request 430. In one embodiment, retrieval request 450 may include instructions to mount a particular storage volume containing the desired data. Backup medium 290 may respond by sending a dataset 455 to backup server 245, which may forward the dataset as dataset 435 to backup agent 215. Catalog 275 may identify the location of data objects corresponding to the requested dataset and send retrieval requests 460 and 470 to single-instance storage pools 255 and 265, respectively in response to receiving request 440. Single-instance storage pool 255 may respond to request 460 by assembling the requested data objects from its pool of data segments, using its mapping of data objects to data segment IDs to find the appropriate data segments. Once the requested data objects have been assembled, single-instance storage pool 255 may send a resulting dataset 465 to backup agent 215. Similarly, single-instance storage pool 265 may respond to request 470 by assembling the requested data objects from its pool of data segments, using its mapping of data objects to data segment IDs to find the appropriate data segments. Once the requested data objects have been assembled, single-instance storage pool 265 may send a resulting dataset 475 to backup agent 215. Backup agent 215 may assemble datasets 435, 465, and 475 into a dataset 425 that may be sent to application 410, completing the data export.

Figure 5:
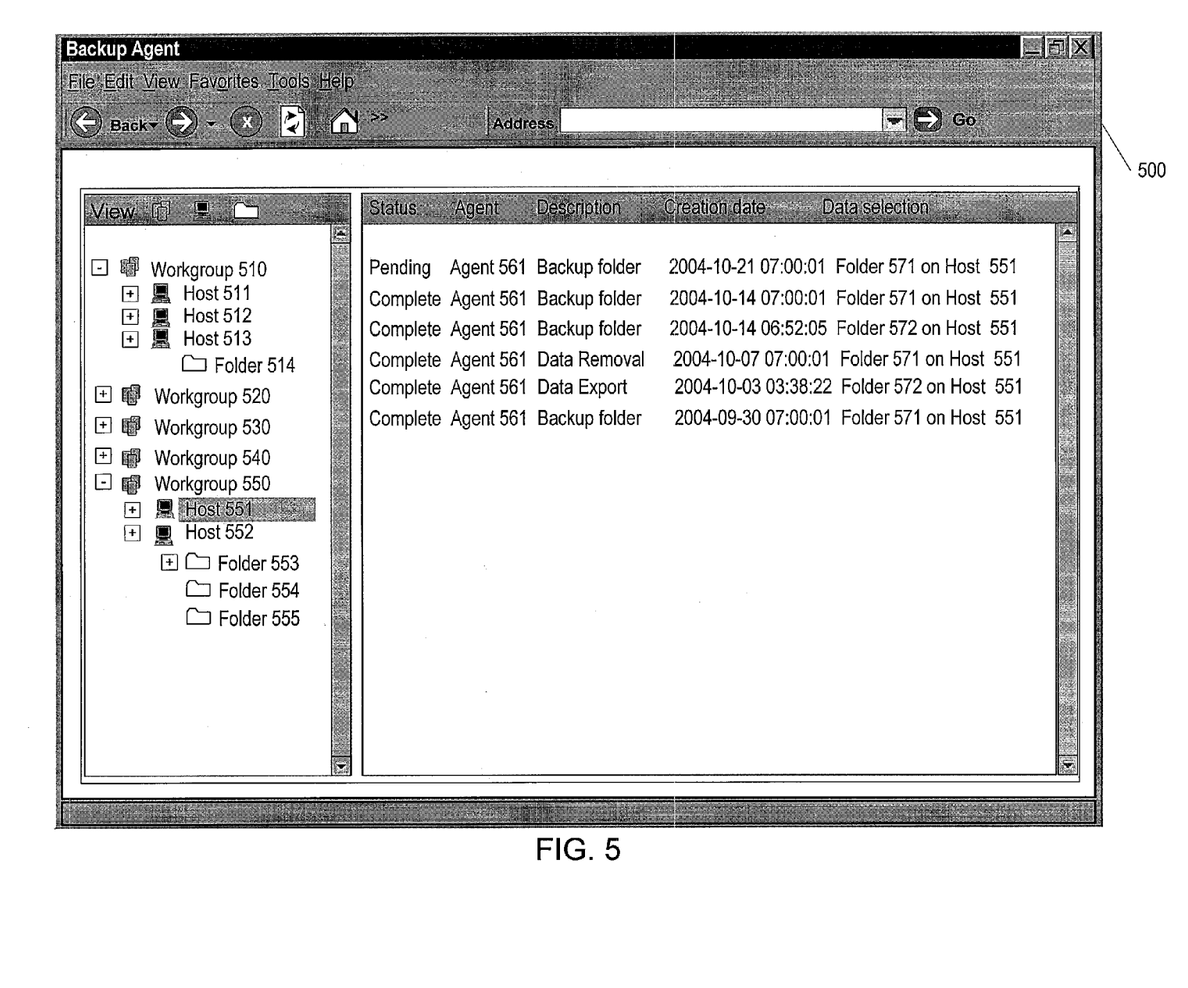
FIG. 5 illustrates one embodiment of a user interface that may be used to view the status of backup operations.

FIG. 5 illustrates one embodiment of a user interface 500 that may be used to view the status of backup operations. As shown, interface 500 is a web browser window that may include the standard browser features such as drop-down menus, a navigation bar, and an address field. Within the interface 500 are shown two panes, a view pane and a history pane. Within the view pan, a hierarchy of networked hosts and their associated data may be seen and navigated. The illustrated network includes workgroups 510, 520, 530, 540, and 550. Each workgroup may include one or more hosts. For example, workgroup 510 includes hosts 511-513 and workgroup 550 includes hosts 551 and 552. Each host may include one or more data folders. For example, host 513 includes folder 514 and host 552 includes folders 553, 554, and 555. As illustrated in FIG. 5, host 551 has been selected.

In the history pane, the history of backup operations related to selected portion of the hierarchy of the view pane may be shown. In the illustrated embodiment, the history of backup operations related to host 551 is shown. Six operations are listed, although many more operations may be listed in alternative embodiments. Each operation may include fields for status, agent, description, creation date, and data selection. The status field indicates whether an operation is still in progress "Pending" or has been completed "Complete." The agent field may contain a string identifying the backup agent that performed the operation. For example, an agent 561 associated with selected host 551 has performed all of the illustrated operations. The description field may include text describing the operation such as that the operation was to backup a folder, remove data, or export data in an archival format. The creation data field may include the data and time at which the associated operation was executed. The data selection field may describe a portion of the system hierarchy on which the operation was performed, such as a data folder, a host, or a workgroup. For example, either folder 571 or folder 572 of selected host 551 is involved in each of the illustrated operations.

To initiate a data export operation, a user may choose a data selection and open a new dialog through which data export parameters may be entered. For example, in one embodiment, a user may right click on a data selection in the view pane of interface 500 to open a data export dialog box. In an alternative embodiment, a data selection may comprise a filter that is applied to a portion of the data hierarchy. Other user interface methods of choosing a data selection and launching a data export will be apparent to those of ordinary skill in the art.

Figure 6:
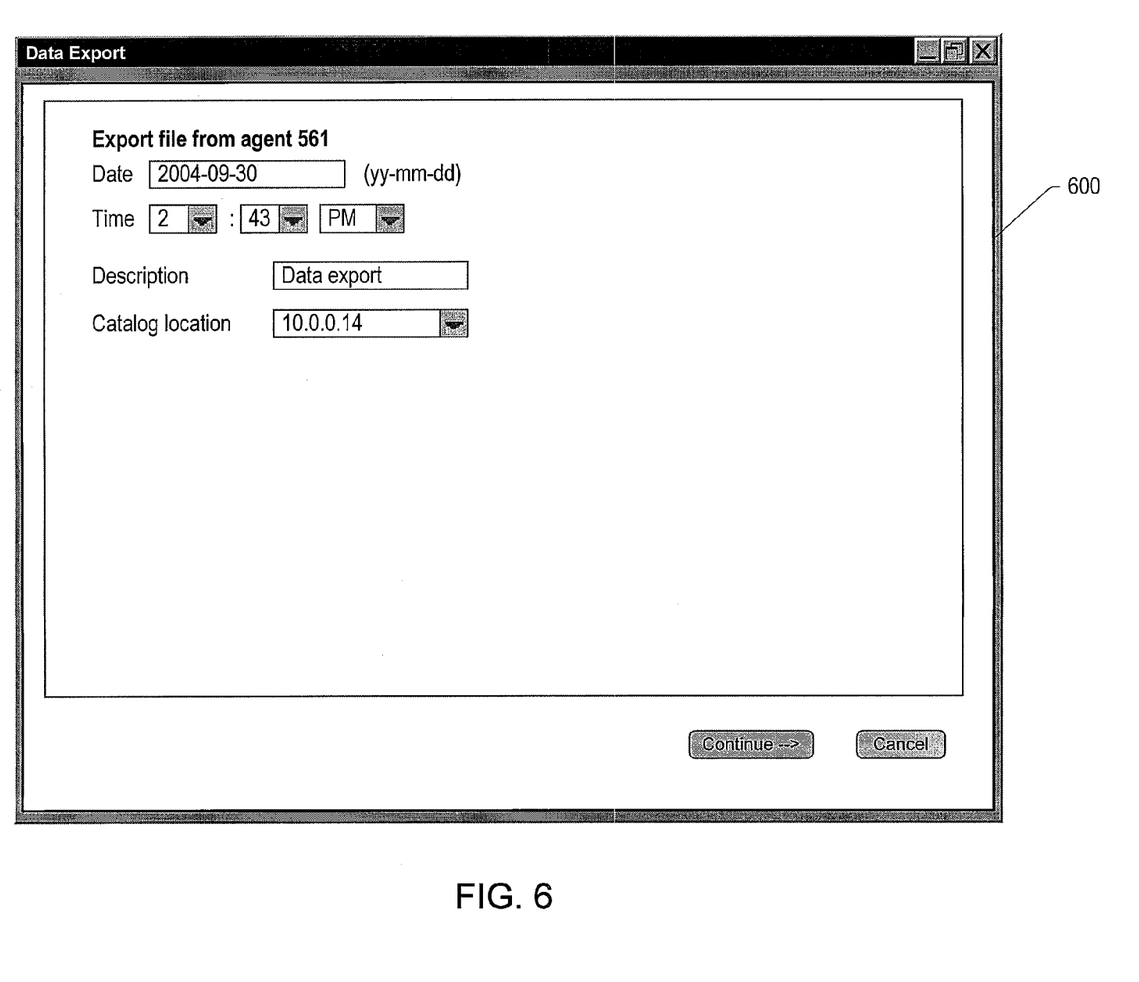
FIG. 6 illustrates one embodiment of a user interface that may be used to perform a data export operation in a backup system.

FIG. 6 illustrates one embodiment of a user interface 600 that may be used to perform a data export operation in a backup system. In the illustrated embodiment, user interface 600 is a dialog box. Interface 600 may display a label identifying the backup agent through which the data export operation may be executed. For example, as shown, a label indicates, "Export file from agent 561." A date entry field and a time entry field are shown through which a user may enter a date and time in the past indicating the point-in-time for which a dataset is to be re-assembled. For example, a user may desire to archive the state of data on a particular host at the last day of the previous year. The date and time entered in interface 600 may be used as parameters to identify data objects stored in a single-instance storage pool to be retrieved and converted to an archival format. Interface 600 may also present the user a field through which to ether a test description of the data export operation and a field through which to select the location of a catalog that may be used to retrieve the desired data objects Once the user has entered the required data export parameters, he or she may click on a Continue button to execute the data export operation. If the user does not wish to save the data export parameters, he or she may click on a Cancel button. In addition to or instead of the illustrated dialog box, other methods of inputting parameters to a data export operation will be apparent to those of ordinary skill in the art. Also, in an alternative embodiment, data export operations may be programmatically initiated by application software.

Figure 7:
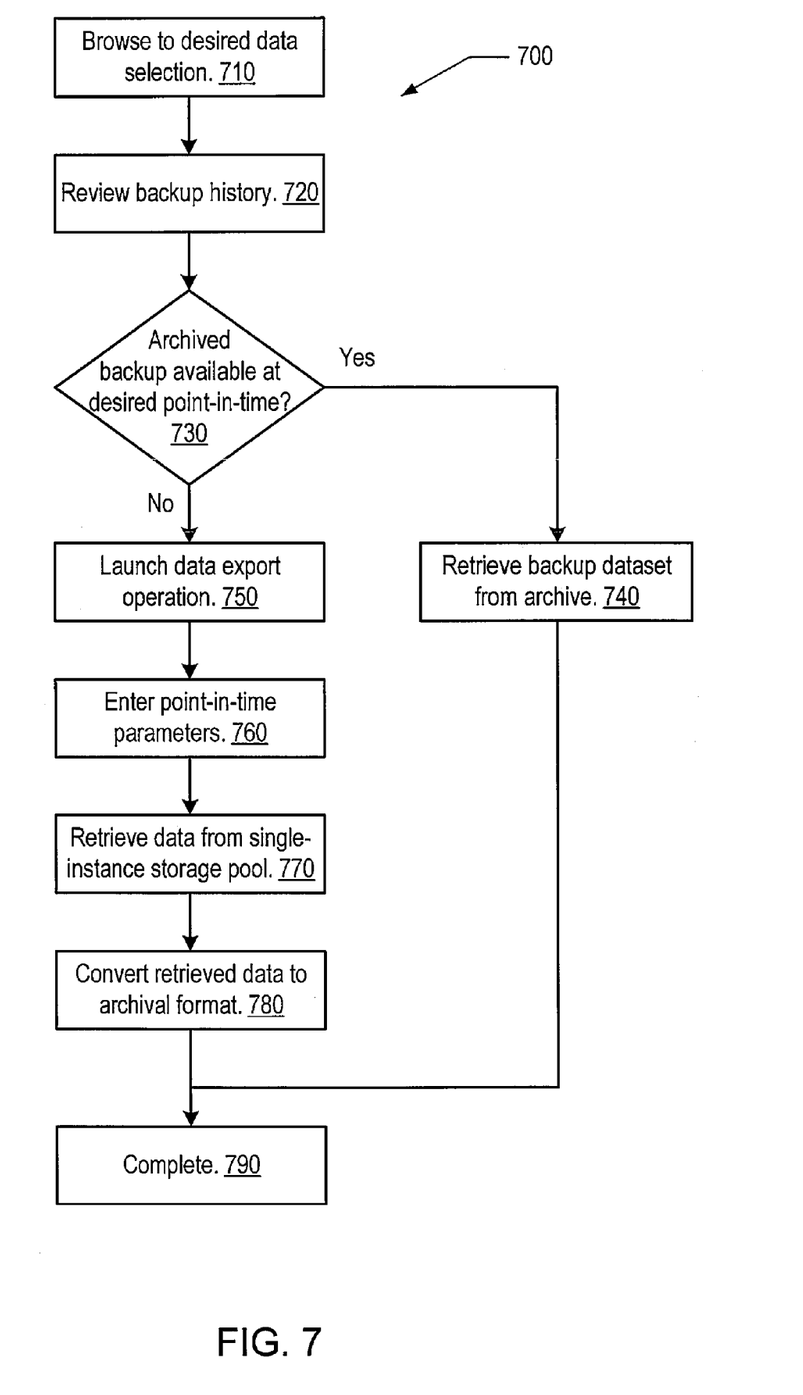
FIG. 7 illustrates one embodiment of a process for exporting data in an archival format.

FIG. 7 illustrates one embodiment of a process 700 for exporting data in an archival format. Process 700 may begin with a choice of a data selection such as a user browsing through a hierarchy of networked hosts and data folders (block 710). Once a data selection has been chosen, a backup history of the data selection may be reviewed (block 720). If upon reviewing the backup history of a data selection, it is determined that an archival format backup of the data selection has been performed at a desired prior point-in-time (decision block 730), then the archival format dataset may be retrieved (block 740) and the data export operation is complete (block 790). If it is determined that an archival format backup of the data selection has not been performed at a desired prior point-in-time (decision block 730), a data export operation may be launched (block 750). Within the data export operation, parameters associated with a desired prior point-in-time may be entered (block 760). A dataset associated with the desired point-in-time may be retrieved from a single-instance storage pool (block 770). A more detailed description of the retrieval operation is given below. Once the desired dataset has been retrieved, it may be converted to an archival format (block 780) and the data export operation is complete (block 790). In one embodiment, an archival format dataset may include both a dataset from archival media and a dataset re-assembled from single-instance storage data objects.

Figure 8:
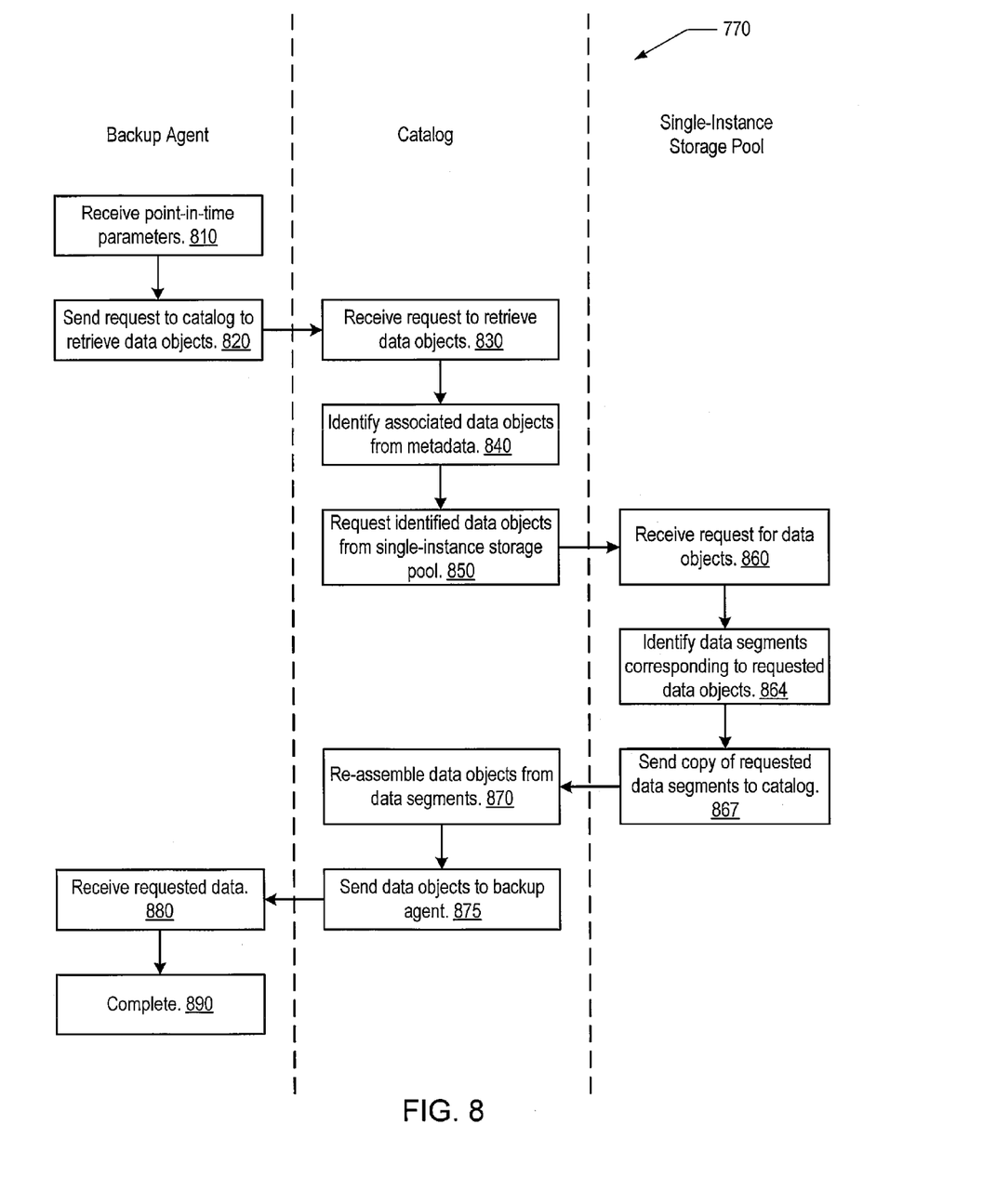
FIG. 8 illustrates one embodiment of process for retrieving data from a single-instance storage pool.

FIG. 8 illustrates one embodiment of process 770 for retrieving data from a single-instance storage pool. Process 770 may begin with a backup agent receiving point-in-time parameters for which a dataset is to be re-assembled from data stored in a single-instance storage pool (block 810). A request may be sent to a catalog associated with a single-instance storage pool to retrieve data objects from the desired point-in-time (block 820). Once the catalog receives the request (block 830), it may identify data objects whose attributes correspond to the desired point-in-time (block 840). The catalog may then send a request to one or more single-instance storage pools for the identified data objects (block 850). The single-instance storage pool may receive the request from the catalog (block 860) and identify data segments that correspond to the requested data objects (block 864). For example, in one embodiment, the single-instance storage pool may identify the data segments by consulting a lookup table in which data objects are mapped to their corresponding data segments. The single-instance storage pool may send the corresponding data segments to the catalog (block 867) where they may be re-assembled into the desired data objects (block 870). In an alternative embodiment, the single-instance storage pool may perform re-assembly and the send resulting data objects to the catalog. The catalog may send the data objects to the backup agent (block 875). When the backup agent receives the request data objects (block 880) the data retrieval process is complete (block 890).

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:

a host configured to convey a first request to export a dataset with a first attribute, said dataset corresponding to previously backed up data;

a catalog describing data stored in a deduplicating single-instance storage pool, the catalog being configured to convey a second request to retrieve a set of data objects whose data object attributes match the first attribute, in response to the first request; and a single-instance storage pool configured to store data in segments and deduplicate stored data segments, each data segment being associated with a unique fingerprint usable to distinguish one data segment from another, wherein the single-instance storage pool is further configured to:

identify and re-assemble each of the set of data objects from one or more of the plurality of data segments that are associated with the set of data objects, in response to the second request; and convey the re-assembled data objects to the catalog;

wherein in response to receiving the re-assembled data objects, the catalog is configured to convert the re-assembled data objects into said dataset in an archival format and store the dataset converted from the re-assembled data objects on a storage medium separate from the single-instance storage pool.

2. A method for exporting data from a single-instance storage pool, the method comprising:

selecting a dataset having a first attribute, said dataset corresponding to previously backed up data;

conveying a request to a catalog describing data stored in a deduplicating single-instance storage pool to export the dataset, wherein the catalog includes a plurality of entries, each entry identifying a data object and an associated set of data object attributes;

a single-instance storage pool storing data in segments and deduplicating stored data segments, each data segment being associated with a unique fingerprint usable to distinguish one data segment from another, the single-instance storage pool:

identifying a set of data objects whose data object attributes match the first attribute;

conveying a request to a single-instance storage pool to retrieve the set of data objects;

associating one or more data segments stored in the single-instance storage pool with each of the set of data objects;

re-assembling each of the set of data objects from its associated one or more data segments;

conveying the re-assembled data objects to the catalog; and the catalog converting the re-assembled data objects into the dataset in an archival format and storing the dataset converted from the re-assembled data objects on a storage medium separate from the single-instance storage pool.

3. A computer readable medium storing computer instructions that are executable by a processor to:

select a dataset having a first attribute, said dataset corresponding to previously backed up data;

convey a request to a catalog describing data stored in a deduplicating single-instance storage pool to export the dataset, wherein the catalog includes a plurality of entries, each entry identifying a data object and an associated set of data object attributes;

wherein the single-instance storage pool stores data in segments and deduplicates stored data segments, each data segment being associated with a unique fingerprint usable to distinguish one data segment from another, the instructions being further executable to cause the single-instance storage pool to:

identify a set of data objects whose data object attributes match the first attribute;

convey a request to a single-instance storage pool to retrieve the set of data objects;

associate one or more data segments stored in the single-instance storage pool with each of the set of data objects;

re-assemble each of the set of data objects from its associated one or more data segments;

convey the re-assembled data objects to the catalog; and cause the catalog to convert the re-assembled data objects into the dataset in an archival format and store the dataset converted from the re-assembled data objects on a storage medium separate from the single-instance storage pool.

4. The system as recited in claim 1, wherein the first attribute comprises:
a data selection identifying a source of the dataset; and
a point in time at which data objects were sent from the data selection to the single-instance storage pool.

5. The system as recited in claim 1, wherein the archival format comprises a format used to store backup datasets on backup media.

6. The method as recited in claim 2, wherein the first attribute comprises:
a data selection identifying a source of the dataset; and
a point in time at which data objects were sent from the data selection to the single-instance storage pool.

7. The method as recited in claim 2, wherein the archival format comprises a format used to store backup datasets on backup media.

8. The computer readable medium as recited in claim 3, wherein the first attribute comprises:
a data selection identifying a source of the dataset; and
a point in time at which data objects were sent from the data selection to the single-instance storage pool.

9. The system as recited in claim 4, wherein the data selection comprises one or more data files stored on a host.

10. The system as recited in claim 4, wherein the data selection comprises a file folder containing one or more data files stored on a host.

11. The system as recited in claim 4, wherein the data selection comprises a filter applied to one or more data files stored on a host.

12. The method as recited in claim 6, wherein the data selection comprises one or more data files stored on a host computer.

13. The method as recited in claim 6, wherein the data selection comprises a file folder containing one or more data files stored on a host computer.

14. The method as recited in claim 6, wherein the data selection comprises a filter applied to one or more data files stored on a host computer.

15. The computer readable medium as recited in claim 8, wherein the data selection comprises one or more data files stored on a host computer.

16. The computer readable medium as recited in claim 8, wherein the data selection comprises a file folder containing one or more data files stored on a host computer.

17. The computer readable medium as recited in claim 8, wherein the data selection comprises a filter applied to one or more data files stored on a host computer.

* * * * *